Aug. 28, 1923.

A. STROTHOTTE

CYCLE CAR

Filed Oct. 3, 1921

1,466,201

2 Sheets-Sheet 1

INVENTOR:
August Strothotte,
BY Hugh H. Wagner,
ATTORNEY

Patented Aug. 28, 1923.

1,466,201

UNITED STATES PATENT OFFICE.

AUGUST STROTHOTTE, OF ST. LOUIS, MISSOURI.

CYCLE CAR.

Application filed October 3, 1921. Serial No. 505,100.

*To all whom it may concern:*

Be it known that I, AUGUST STROTHOTTE, a citizen of the United States, residing at the city of St. Louis, in the State of Missouri, have invented certain new and useful Improvements in Cycle Cars, of which the following is a specification.

The object of this invention is to provide a framework, a steering mechanism, and a seat-support for a cycle-car (i. e., motor-cycle with a side-car attached), especially constructed so as to allow the operator to sit on a real seat instead of on a saddle, the whole being so designed, arranged, and constructed as to provide a construction of this character that is cheap to manufacture and that will be strong and durable and will not easily get out of order.

Figure 1:
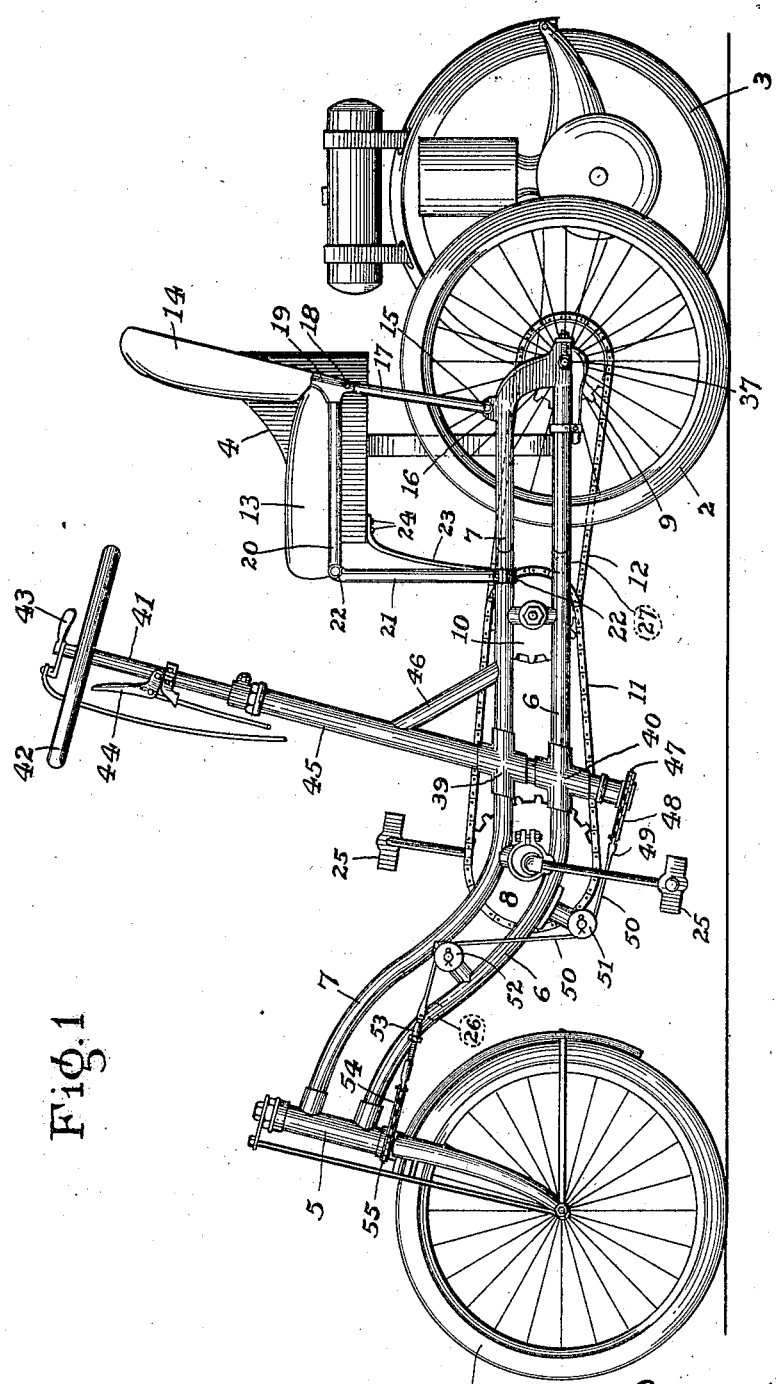
Figure 2:
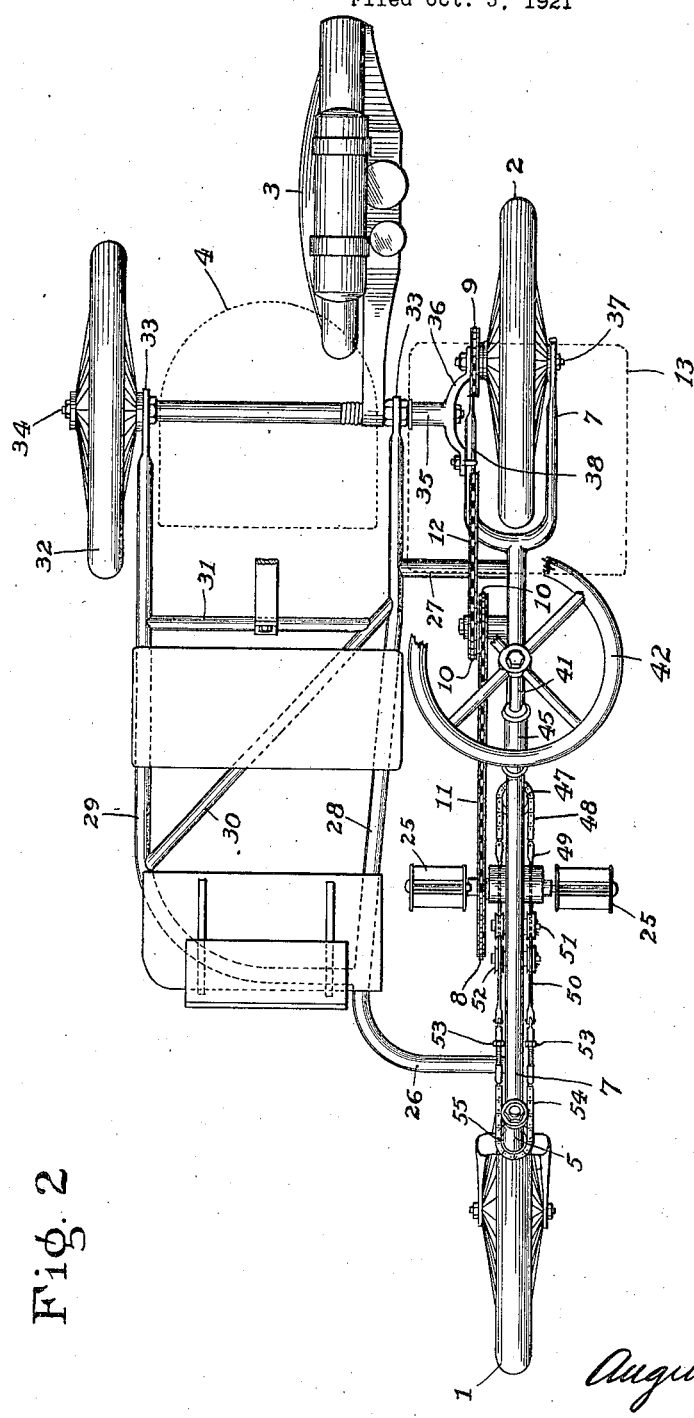

In the accompanying drawings forming part of this specification, in which like numbers of reference denote like parts wherever they occur, Figure 1 is a side elevation; and Figure 2 is a top plan view.

The front wheel 1, rear wheel 2, and motor-wheel 3 are of any ordinary or desired construction. So, also, are parts of the side-car 4, which can be detached when desired and the motor-cycle used merely as such.

To the ordinary steering-head 5 are attached the lower and upper members 6 and 7 of the bicycle frame, which in some respects is of ordinary construction, but which in others is differentiated for the particular purposes of the present invention.

The sprocket-wheels 8, 9, and 10 and sprocket-chains 11 and 12 are of ordinary and understood construction and use.

A seat 13 having a back 14 is mounted on member 7 of the frame, being pivoted at 15 to lug 16 projecting thereabove, leg 17 being pivoted also at 18 to the bracket 19 forming part of the seat-support 20. Leg 21 is pivoted at 22 to seat-support 20, and at its lower end terminates in a sleeve 22, adapted to slide longitudinally on frame member 7, this being for purposes of adjustment.

The motor can be started by pedaling in the usual way with the pedals 25, or by lifting the motor-wheel free from the ground and cranking the same by hand. These features are old.

For the attachment of the side-car 4, arms 26 and 27 are provided, the same being connected to the frame members 6 and 7 in such a way as to be easily attached to and detached therefrom. In combination with the frame composed of members 6 and 7, and conjoined also with the frame members 28, 29, 30, and 31 of the side-car 4, they constitute a strong structure of great durability and which, with the wheels 1, 2, 3, and 32, holds the ground very well. The rear-ends of the members 28 and 29 are provided with eyes 33, which encircle the axle-shaft 34 of wheel 32, the other end of which axle-shaft 34 is received in sleeve 35 as a bearing, the said sleeve being attached by bracket 36 to the axle-shaft 37 of wheel 2 and also to the arm 38 of the main bicycle frame.

The cross-joint 39 mounted on member 7 and cross-joint 40 mounted on lower member 6 make the two parts of each of the said members substantially continuous, but afford a hollow passage nearly vertical through each for the steering-rod 41, to which is affixed steering-wheel 42, in conjunction with which are mounted the fuel-control 43 and the brake-lever 44. In the usual way steering-rod 41 is mounted in and supported by the hollow column 45, which is braced from the member 7 by the brace 46 and supported from cross-joint 39. On the lower end of steering-rod 41 is affixed a sprocket-wheel 47, which operates a sprocket-chain 48, connected by a turnbuckle 49 to cords 50, which pass over pulleys 51 and 52 and are connected by turnbuckle 53 to sprocket-chain 54, which drives a sprocket-member 55 on steering-post 5.

When steering-wheel 42 is turned in either direction, it actuates sprocket 47, and thereby and the intermediate parts the sprocket 55 and steering-head 5. Thereby the machine is steered.

The support that hollow column 45 receives from cross 39 and cross 40, and the frame members 6 and 7, is such as to make the same entirely rigid, thereby affording solid support for steering-rod 41, and a positive means of steering wheel 1 through the instrumentality of sprocket 47. The column 45, members 6 and 7, members 26 and 27, and members 28 and 29 form substantially a one-piece frame, giving great rigidity and solidity to the entire construction.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a cycle, supporting wheels, a frame connecting said wheels, said frame comprising a steering head member operatively connected to the front wheel of said cycle, and parallel members rigidly secured to said steering head member, said parallel members being curved downwardly to the rear of said front wheel and thence extending in horizontal positions toward the rear wheel, and a rearwardly inclined frame member connecting the horizontal portions of said parallel members and constituting a steering post, a steering rod rotatively mounted within said steering post, a steering wheel secured to the top of said rod, a sprocket mounted on the lower end of said rod below said frame members, a steering rod rotatably mounted within the steering head member, a sprocket secured to the lower end of the last named steering rod, means connecting the sprockets including sprocket chains, turnbuckles and cords, a plurality of guiding means for said cords rigidly secured to said frame members so as to maintain portions of the cords and the sprocket chains in the planes of the respective sprockets, and a seat secured above the rear portion of the frame substantially forwardly of the rear wheel between its center and the steering wheel.

2. In a cycle, steering wheels, a frame connecting said wheels, said frame comprising a steering head inclined rearwardly operatively connected to said front wheel, parallel members rigidly secured to said steering head and curved downwardly from said head, the rear portions of said parallel members lying in horizontal positions, a rotative steering member mounted beneath said steering head so as to cause the front wheel to be turned to steer the cycle, a steering post connecting the horizontal portions of said parallel members, a rotative steering rod within said post, said steering rod projecting beneath the horizontal portions of said frame members, a rotative steering member located beneath said horizontal portions of said parallel members and rigidly secured to said rod, said last named steering member being mounted in a plane substantially parallel to the plane of the first steering member and below the same, a flexible means connecting said steering members so that the front wheel of the cycle will be responsive to the movements of said steering rod.

In testimony whereof I hereunto affix my signature.

AUGUST STROTHOTTE.